(12) United States Patent
Fislage

(10) Patent No.: US 8,103,933 B2
(45) Date of Patent: Jan. 24, 2012

(54) METHOD FOR SECURING DATA AND DEVICE FOR IMPLEMENTING THE SAME

(75) Inventor: Markus Fislage, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 807 days.

(21) Appl. No.: 11/884,830

(22) PCT Filed: Feb. 24, 2006

(86) PCT No.: PCT/EP2006/060248
§ 371 (c)(1),
(2), (4) Date: Sep. 8, 2008

(87) PCT Pub. No.: WO2006/089943
PCT Pub. Date: Aug. 31, 2006

(65) Prior Publication Data
US 2009/0003220 A1 Jan. 1, 2009

(30) Foreign Application Priority Data
Feb. 25, 2005 (DE) .......................... 10 2005 008 716

(51) Int. Cl.
*H03M 13/00* (2006.01)

(52) U.S. Cl. ........................................ 714/758; 702/189
(58) Field of Classification Search .................. 714/758; 702/189
See application file for complete search history.

(56) References Cited

U.S. PATENT DOCUMENTS 6,003,151 A 12/1999 Chuang et al.
6,421,805 B1 * 7/2002 McAuliffe ..................... 714/756

* cited by examiner

*Primary Examiner* — Guy Lamarre
(74) *Attorney, Agent, or Firm* — Kenyon & Kenyon LLP

(57) ABSTRACT

A method and system to ensure the integrity of data in a data-processing device, a data packet is read from a memory and checked to determine whether the data packet is an existing code word of a predefined first code, and if the data packet is an existing code word, the data packet is accepted as intact, and if the data packet is not an existing code word, at least one data block of an error-correcting second code that overlaps with the read data packet is ascertained, and an error is searched for in the data packet using the second code, and the data packet is corrected on the basis of the result of the search, and the corrected data packet is accepted as intact.

11 Claims, 2 Drawing Sheets

METHOD FOR SECURING DATA AND DEVICE FOR IMPLEMENTING THE SAME

FIELD OF THE INVENTION

The present invention relates to a method for ensuring the integrity of data in a data-processing device, and to a device capable of implementing such a method.

BACKGROUND INFORMATION

In devices used for controlling machines or processes, it is vitally important to absolutely ensure the integrity of the data which are accessed by these devices to execute their control tasks. Errors in these data, which are attributable to a technical fault in the device itself, or to an unauthorized access by a third party, must be detected with certainty, in order to be able to block every function whose operational reliability is no longer ensured.

It has been known for quite some time to ensure the integrity of data in a data-processing device by storing the data in an encoded form, and to then only utilize the data when they represent a valid code word of the code being used. In the simplest case, the encoding process can entail adding a parity bit or a checksum.

The significant advantage of these codes is their simplicity, which makes it possible for a test to be conducted to check whether a data word read in the memory is an existing code word, in real time or even independently of a read access to the code word in question. Microcomputers are known, for example, which, for every eight memory components, which store various bits of a data byte, have a ninth memory component for a parity bit, and which have a control circuit, which, for every byte read from the eight memory components, calculates the parity bit, which is compared to that stored in the ninth memory component, and, if there is no agreement, signals a fault.

Using this method, it is, in fact, possible to detect errors in the stored data, however, it is not possible to correct the errors. Therefore, a control process, which attempts to access faulty data can, at best, be terminated; no provision is made for continuing the process on the basis of corrected data. However, this is not a satisfactory approach for applications where terminating a process can pose a safety risk, as can, just as well, continuing the process using faulty data.

In the field of motor-vehicle control units, it is known to avoid these problems by storing safety-critical data multiple times, so that, if a data value that is to be accessed, is identified as faulty, a copy is available, which can be used instead of the faulty value.

This procedure typically requires a substantial amount of memory, since, on the one hand, at least two copies of each safety-critical datum must be stored, and, moreover, redundant information must be available to allow one to discern whether the datum to be accessed is faulty or not.

SUMMARY OF THE INVENTION

In accordance with the present invention, a method for ensuring the integrity of data in a data-processing device, and a suitable device for implementing the method are devised, which make it possible to ensure the integrity of the data, while substantially reducing the outlay required for memory capacity.

The present invention is based on the use of two different codes for encoding data to be secured: a first code, which is merely required to allow the existence of an error to be recognized and, therefore, to be readily and quickly decodable, and a second code, which, besides making it possible to recognize errors, also permits correction thereof, and which is used when a data word has been read that does not correspond to any existing code word of the first code, in order to identify and rectify the error thereof.

The method according to the present invention includes the following steps:

a) reading a data packet from a memory and checking to determine whether the data packet is an existing code word of the first code;

b) if the data packet is an existing code word, accepting the data packet as intact;

c) if the data packet is not an existing code word, c1) ascertaining at least one data block of the error-correcting second code that overlaps with the read data packet;

c2) searching for an error in the data packet using the second code;

c3) correcting the data packet on the basis of the result of the search; and c4) accepting the corrected data packet as intact.

The reliability of the method may be substantially enhanced by carrying out step c4), only when it is ascertained subsequently to step c3) that the corrected data packet is an existing code word of the first code.

The method according to the present invention may be successively applied to a plurality of data packets, whereby these data packets may have different lengths. In particular, when the data include program instructions which are subdivided into a plurality of routines, it is possible to set the boundaries among the data packets to coincide at least partially with the boundaries among the program routines. When it is ascertained that such a read data packet corresponds to an existing code word of the first code, then the routine embodied in this data packet may be released for execution, regardless of whether another one of the routines is potentially faulty. Thus, the option is provided for the device to be operated with a limited range of function, when a data packet proves to be faulty and the error is also not correctable using the second code.

A data packet, which has been error-corrected using the second code, is expediently rewritten to the memory from which it had previously been erroneously read, in order to correct the memory contents in this manner. Partial data losses may be automatically corrected in this manner.

To definitively rule out any inadvertent accessing of faulty data, it may be provided that every data packet, which is accepted as intact, be entered into a random access memory, and that later accesses to this data packet take place in this random access memory. Since faulty data packets, which are not correctable, do not arrive in this memory, any access to the same is ruled out.

Prior to being entered, the accepted data packet is advantageously decoded, the decoding process may provide for separating a redundant portion of the code word of the first code that is formed by the data packet, the redundant portion merely being used for checking for the presence of errors, from a useful portion of the code word, and for entering the latter exclusively as a decoded code word into the random access memory.

The code words of the second code are also advantageously composed of a useful portion, which is identical to the decoded code word, and of a redundant portion, which is derivable from the useful portion in accordance with a prescribed method and which may be separated in a simple manner during the decoding process.

Other features and advantages of the present invention are derived from the following description of exemplary embodiments in light of the enclosed figures.

DETAILED DESCRIPTION

Figure 1:
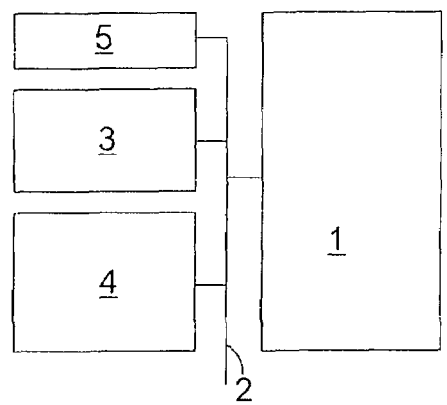
FIG. 1 shows a block diagram of a motor-vehicle control unit, as an example of a data-processing device according to the present invention.

The block diagram of FIG. 1 schematically depicts the structure of a control unit according to the present invention. The control unit includes a microprocessor or microcontroller 1, which is linked via a bus 2 to a flash memory 3 and to a RAM 4. Sensors and actuators (not shown in the figure) for controlling the operation of a motor vehicle engine are connected to microcontroller 1 via bus 2.

An operating program for microcontroller 1 is stored in flash memory 3 in encoded form.

Help routines, required by microcontroller 1, for decoding the contents of flash memory 3, are stored in a ROM 5. ROM 5 is shown in the figure as a circuit that is separate from microcontroller 1, but it may be integrated, together with microcontroller 1, on one same semiconductor substrate to provide enhanced protection against unauthorized manipulation.

Figure 2:
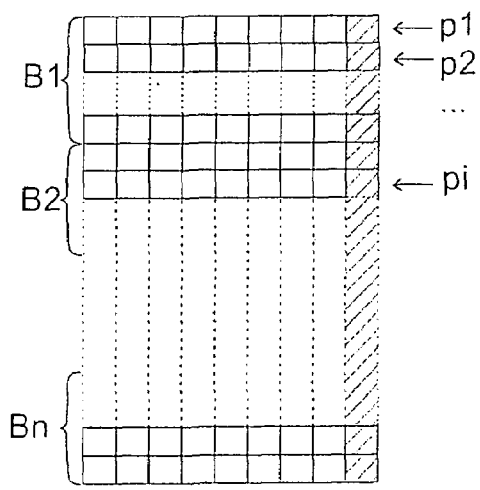
FIG. 2 shows the distribution of the data in the flash memory of the device from FIG. 1 in accordance with a first embodiment.

FIG. 2 illustrates a first example of the structure of the data stored in flash memory 3. In FIG. 2, each data bit is represented by a rectangle, so that each row represents a 9-bit data packet p1, p2, . . . , which is composed of eight useful bits, represented as empty rectangles, and one parity bit shown in hatched shading. Thus, each data packet p1, p2 . . . may be interpreted as a code word of a code, whose code words are obtained by attaching a parity bit to a byte. The contents of the memory are subdivided into a multiplicity of blocks B1, B2 . . . Bn, each containing the same number of data packets, for example 255 units. The data blocks undergo a Reed-Solomon encoding, i.e., each block contains a fixed number of useful data packets, for example 223 units, and a smaller number, in this case 32, of correction data packets, which are calculated from the useful data packets using a prescribed method and which enable errors in the Reed-Solomon code words to be located and corrected in a manner known per se.

In FIG. 2, the blocks are each arranged in a single, cohesive configuration in memory 3. It is also possible, however, and even advantageous for the successive reading of the useful data, for the useful data packets of all RS-encoded data blocks to be arranged at successive memory locations and for the corresponding correction data packets to be stored separately.

Figure 3:
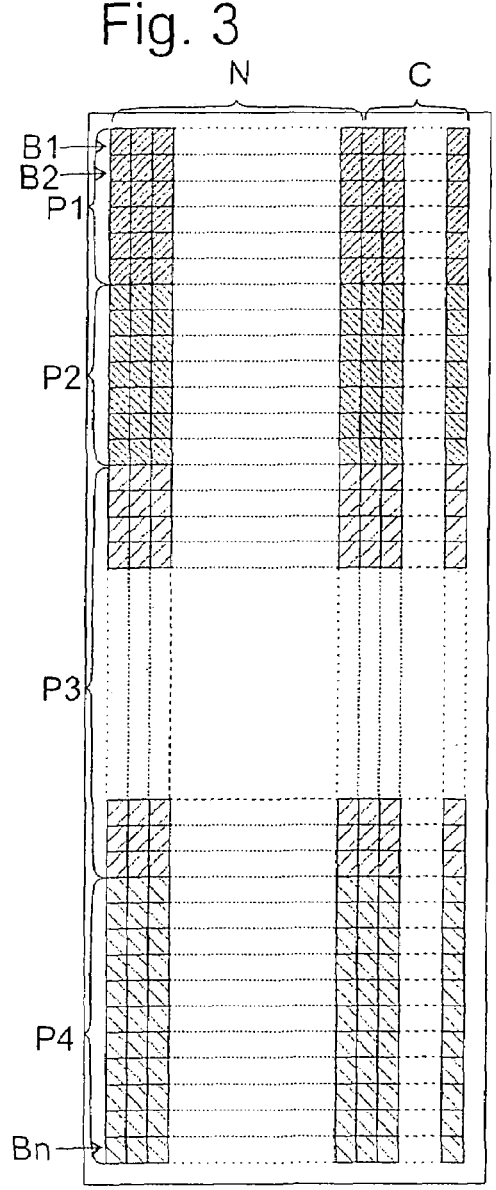
FIG. 3 shows the distribution of the data in the flash memory in accordance with a second embodiment.

A modified partitioning of flash memory 3 is shown in FIG. 3. Here, each rectangle represents one byte, and each row of the diagram represents a Reed-Solomon encoded data block of, for example, 255 bytes, which is composed, as in the case of FIG. 2, of 233 useful data bytes N and 32 correction bytes C. The program instructions stored in the flash memory are structurally organized in a plurality of routines, each one of which occupies a number of such RS-encoded blocks B1, B2 . . . Bn. The boundaries among the routines, which are successively entered in the memory, are defined in such a way that each one of blocks B1, B2 . . . Bn contains instructions from maximally one routine, represented in the figure by different types of hatched shading. The RS-encoded blocks belonging to one same routine are combined into data packets P1, P2, P3, P4, each one of which is encoded by adding checksum information a second time, it being possible for the checksum information to be entered arbitrarily into flash memory 3, immediately following the useful data of packet P1, P2, P3 or P4 that it relates to, or for the checksum information of a multiplicity of packets to be combined in a memory area that is separate in terms of addresses, from the useful data thereof.

Figure 4:
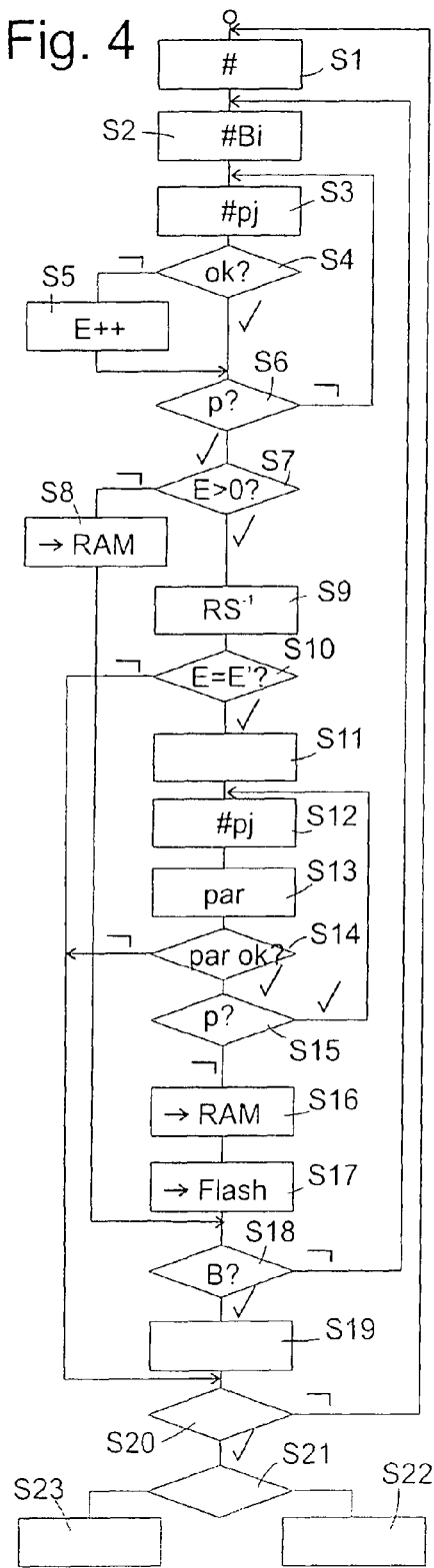
FIG. 4 shows a flow chart of a first embodiment of a method for ensuring the integrity of the data of the flash memory.

FIG. 4 shows a flow chart of the processing operation executed by microcontroller 1 in order to verify the integrity of the data in a flash memory 3 structurally organized in accordance with FIG. 2. Such a verification may take place when the control unit is started, in particular, or also at specified times during operation of the control unit, if sufficient processing capacity is available.

In step S1, the microcontroller selects one of the routines stored in the flash memory. In step S2, it selects a block Bi=B1, B2 . . . or Bn of this routine and, in step S3, a data packet pj, j=1, 2 . . . of block Bi. Step S4 is a parity check, as is known per se, of data packet pj. If the check operation reveals that the parity bit is correct, the process advances directly to step S6; alternatively, an error-counter count value E, which had been set to zero upon selection of a block in step S2, is incremented beforehand (step S5).

In step S6, it is checked whether all data packets of block Bi have been selected, and the process of checking block Bi is thus ended. If the response is negative, the process returns to step S3; if the response is affirmative, it continues to step S7, where it is checked whether count value E is greater than zero. If this is not the case, i.e., if the parity values of all data packets are correct, the block is accepted as being error-free in step S8 and is transferred into RAM 4, and the process jumps to step S18, as will be discussed in greater detail further on.

If it turns out in step S7 that count value E differs from zero, then a Reed-Solomon decoding is applied to block Bi in step S9, in order to ascertain the number and position of faulty bits in the block. A check operation is performed in step S10 to determine whether error count E' ascertained in step S9 deviates from count value E of the error counter. An affirmative response indicates that one of the two error counts E, E' must be incorrect, and, consequently, that the information obtained in step S9 regarding the position of the supposedly faulty bits is also uncertain. Since, in such a case, it is not definite that the error correction is possible, the process for the routine in question is terminated by a jump to S20.

When it is determined in step S10 that the ascertained error counts agree, then it may be assumed with reasonable certainty that, by correcting the bits identified as faulty, the correct data are restored, so that, in step S11, an appropriate correction is made to all blocks containing a fault bit, to packets pj of block Bi.

In step S12, a data packet pj; j=1, 2, . . . of the thus obtained, supposedly error-free data block Bi is selected, and the parity of its eight useful bits is ascertained in step S13. When, in step S14, comparing the ascertained parity with the parity stored in the ninth bit reveals lack of agreement, the data fail to be corrected for the routine in question, and the process advances to step S20. When the test reveals a correct parity, a test follows in step S15 to determine whether all data packets pj of the block have been selected. If the result is negative, the process returns to step S12 where a new data packet is selected. If the result is affirmative, the process of correcting block Bi is terminated; block Bi is accepted in step S16 and entered into RAM 4. In addition, in step S17, block Bi or at least its data packets identified as faulty are overwritten with appropriately corrected values in flash memory 3, so that the contents of flash memory 3 are again correct, and the error should not be repeated during a new test.

It is subsequently checked in step S18 to determine whether all blocks of the currently selected routine have been processed. If the response is negative, the process returns to step S2 to select a new block; if the response is affirmative, the routine that had been entered in its entirety into RAM 4 in the meantime is released for execution by processor unit 7 (S19).

It is subsequently checked in step S20 to determine whether an unprocessed routine still remains; if the response is affirmative, a routine that is still unprocessed is selected in step S1, and the process is repeated for this routine; alternatively, a step S21 follows to evaluate the routines released for execution to determine whether they suffice for an operation of the control unit, even if possibly with a limited range of function. Even if there is no routine that is considered to be vitally important missing in RAM 4, processor unit 7 begins to execute the routines contained therein (S22), if indicated, an error message being output for each missing routine. If a routine that is considered to be vitally important is missing, then processor unit 7 is not put into operation (S23).

Figure 5:
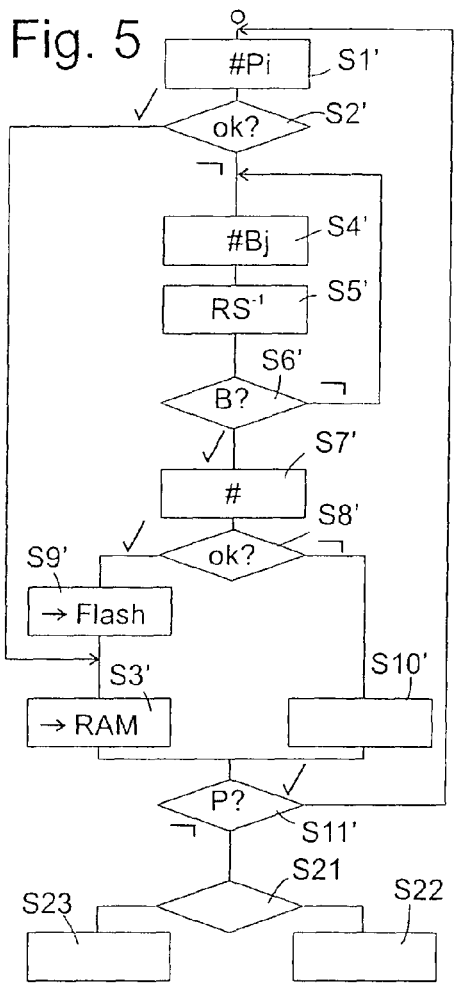
FIG. 5 shows a flow chart of a second embodiment of the method.

FIG. 5 shows a processing sequence for the case illustrated in FIG. 3 where the program instructions of a routine each constitute the useful data of a data packet, and where a data packet includes a multiplicity of Reed-Solomon encoded blocks. The selection of a routine in step S1' is synonymous in this case with the selection of a data packet Pi, i=1, 2, . . . . Data packet Pi is read in its entirety from flash memory 3. It is interpreted as a code word that is composed of a useful data portion and of integrity testing information, such as of a multiplicity of parity bits, a cyclical checksum, a CRC datum or the like, computed from this useful data portion. In step S2', microcontroller 1 checks whether the data word is an acceptable code word by computing the integrity testing information from the read useful data and comparing the same with the read integrity testing information. If there is agreement, the read data packet is an existing code word; it is accepted as being correct in step S3'; and its useful data are entered into RAM 4. On the other hand, if there is no agreement, then this indicates the presence of an error. In this case, one of blocks Bj, j=1, 2 . . . of the packet in question is selected in step S4', and, using the RS decoding, errors of this block are searched for and, if indicated, corrected in step S5'. Steps S4' and S5' are repeated multiple times until it is ascertained in step S6' that all blocks of data packet Pi have been processed. In the process, both the useful data, as well as the corresponding integrity testing information may be identified as faulty, and corrected.

When all blocks of packet Pj have been processed, the integrity testing information for packet Pi is again computed on the basis of the corrected useful data in step S7', and compared in step S8' with the read integrity testing information (that had possibly been corrected in step S5'). If there is agreement, the process advances to step S9', where the obviously incorrectly stored data packet Pi is overwritten with corrected data packet Pi obtained in step S5'. The process subsequently advances to step S3'. If there is no agreement, the routine in question is identified as being irreparably faulty and is not accepted into RAM 4 (S10'). Subsequently to both step S3', as well as S10', a test is performed in step S11' to determine whether a routine is still to be processed, respectively if a data packet remains. If the response is affirmative, the process returns to step S1'. If the response is negative, the processing of steps S21 through S23 described in connection with FIG. 4 follows.

In this manner, a high level of security is achieved for the data of flash memory 3, without memory capacity having to be made available for a plurality of copies of these data.

What is claimed is:

1. A method for ensuring integrity of data in a data-processing device, the method comprising:
   aa) reading a data packet from a memory, the data packet including a first data and a first integrity testing information regarding the first data;
   ab) computing a second integrity testing information from the read first data;
   ac) comparing the first integrity information with the second integrity information to determine whether the data packet is an existing code word of a predefined first code;
   b) if the data packet is an existing code word, accepting the data packet as intact; and
   c) if the data packet is not an existing code word, performing the following:
      c1) ascertaining at least one data block of an error-correcting second code that overlaps with the read data packet;
      c2) searching for an error in the data packet using the second code; and
      c3) correcting the data packet based on the result of the search;
   wherein:
      the data, whose integrity is to be ensured, encompass a plurality of data packets of different lengths, and steps a) through c3) are executed for each of these data packets; and
      the data include program instructions which are subdivided into a plurality of routines, and at least some of the boundaries among the data packets, which are stored successively in the memory, coincide with boundaries among the program routines.

2. The method of claim 1, wherein:
   c) includes c4) accepting the corrected data packet as intact, and
   operation c4) is only performed when it is ascertained subsequently to operation c3) that the corrected data packet is an existing code word of the first code.

3. The method of claim 1, wherein the corrected data packet obtained in operation c3) is rewritten to the memory.

4. The method of claim 1, wherein:
   c) includes c4) accepting the corrected data packet as intact; and
   every data packet, which is accepted as intact, is entered into a random access memory.

5. The method of claim 4, wherein, prior to being entered, the accepted data packet is decoded.

6. The method of claim 1, wherein codes are used in each instance as at least one of a first code and a second code, in the case of which each code word is composed of a useful portion, which is identical to the decoded code word, and of a redundant portion, which is derivable from the useful portion.

7. A data-processing device, comprising:
   a first memory, whose contents are subdivided into a plurality of data packets of a first code, and into a plurality of data blocks of a second, error-correcting code; and
   a decoding device for decoding the data words, and an error-correcting device for correcting errors in the data blocks;

wherein:
the decoding device are operable for ensuring integrity of data by performing the following:
aa) reading a data packet from a memory, the data packet including a first data and a first integrity testing information regarding the first data;
ab) computing a second integrity testing information from the read first data;
ac) comparing the first integrity information with the second integrity information to determine whether the data packet is an existing code word of a predefined first code;
b) if the data packet is an existing code word, accepting the data packet as intact; and
c) if the data packet is not an existing code word, performing the following:
c1) ascertaining at least one data block of an error-correcting second code that overlaps with the read data packet;
c2) searching for an error in the data packet using the second code; and
c3) correcting the data packet based on the result of the search;
the data, whose integrity is to be ensured, encompass a plurality of data packets of different lengths, and steps a) through c3) are executed for each of these data packets; and
the data include program instructions which are subdivided into a plurality of routines, and at least some of the boundaries among the data packets, which are stored successively in the memory, coincide with boundaries among the program routines.

8. The device of claim 7, wherein the first memory is overwritable with corrected data blocks, under the control of the error-correcting device.

9. The device of claim 7, wherein the memory includes a volatile memory for storing the decoded data words.

10. The device of claim 9, further comprising: a processor for executing program instructions encoded in the data words and which accesses the volatile memory to read the program instructions.

11. The device of claim 7, wherein it is a motor-vehicle control unit.

* * * * *